(12) United States Patent
Zhang (10) Patent No.: US 8,370,382 B2
(45) Date of Patent: Feb. 5, 2013

(54) METHOD FOR FACILITATING THE SEARCH OF VIDEO CONTENT

(76) Inventor: Ji Zhang, Monte Sereno, CA (US)

( * ) Notice: Subject to any disclaimer, the term of this patent is extended or adjusted under 35 U.S.C. 154(b) by 477 days.

(21) Appl. No.: 12/085,829

(22) PCT Filed: May 21, 2008

(86) PCT No.: PCT/CN2008/071028
§ 371 (c)(1),
(2), (4) Date: May 30, 2008

(87) PCT Pub. No.: WO2009/140817
PCT Pub. Date: Nov. 26, 2009

(65) Prior Publication Data
US 2010/0169358 A1    Jul. 1, 2010

(51) Int. Cl.
*G06F 7/00* (2006.01)
*G06F 17/30* (2006.01)
(52) U.S. Cl. ....................................... 707/769
(58) Field of Classification Search .................. 707/769, 707/999.003
See application file for complete search history.

(56) References Cited

U.S. PATENT DOCUMENTS

| | | | |
|---|---|---|---|
| 3,919,479 A | 11/1975 | Moon et al. | |
| 5,019,899 A | 5/1991 | Boles et al. | |
| 5,870,754 A | 2/1999 | Dimitrova et al. | |
| 5,926,223 A * | 7/1999 | Hardiman | 375/240.03 |
| 6,037,986 A | 3/2000 | Zhang et al. | |
| 6,084,539 A * | 7/2000 | Yamada | 341/155 |
| 6,374,260 B1 | 4/2002 | Hoffert et al. | |
| 6,473,529 B1 | 10/2002 | Lin | |
| 6,834,308 B1 | 12/2004 | Ikezoye et al. | |
| 7,336,841 B2 | 2/2008 | Neogi | |
| 7,523,312 B2 | 4/2009 | Kalker et al. | |
| 7,809,154 B2 | 10/2010 | Lienhart et al. | |
| 2003/0126276 A1 | 7/2003 | Kime et al. | |
| 2004/0021669 A1 | 2/2004 | Fredlund et al. | |
| 2004/0240562 A1 | 12/2004 | Bargeron et al. | |
| 2005/0141707 A1 | 6/2005 | Haitsma et al. | |
| 2005/0213826 A1 | 9/2005 | Neogi | |
| 2006/0129822 A1 | 6/2006 | Snijder et al. | |

(Continued)

FOREIGN PATENT DOCUMENTS

| | | |
|---|---|---|
| CN | 1190218 A | 8/1998 |
| CN | 2387588 Y | 7/2000 |

(Continued)

OTHER PUBLICATIONS

Non-final Office Action dated Oct. 26, 2010, for U.S. Appl. No. 12/085,928.

(Continued)

*Primary Examiner* — Alexey Shmatov (57) ABSTRACT

A method for facilitating the search of video content by matching fingerprint data extracted from a given video content with existing video fingerprint data already stored in the database. The system consists of systems for extracting fingerprint from the video content, the database for storing plurality of fingerprint data entries from known video content segments and systems for comparing between the fingerprint data obtained from the video content with the fingerprint data entries obtained from the fingerprint database. Once a match is identified, the video content associated with the matched fingerprint in the database is said to be identified by the information in the database associated with the match. The information referenced from the database includes archived video information.

7 Claims, 9 Drawing Sheets

U.S. PATENT DOCUMENTS

| | | | |
|---|---|---|---|
| 2006/0184961 | A1 | 8/2006 | Lee et al. |
| 2007/0055987 | A1 | 3/2007 | Lu et al. |
| 2007/0071330 | A1* | 3/2007 | Oostveen et al. ............. 382/228 |
| 2007/0124796 | A1 | 5/2007 | Wittkotter |
| 2007/0136782 | A1 | 6/2007 | Ramaswamy et al. |
| 2007/0162571 | A1* | 7/2007 | Gupta et al. ................. 709/219 |
| 2007/0186228 | A1 | 8/2007 | Ramaswamy et al. |
| 2007/0186229 | A1 | 8/2007 | Conklin et al. |
| 2008/0148309 | A1 | 6/2008 | Wilcox et al. |
| 2008/0310731 | A1 | 12/2008 | Stojancic et al. |
| 2009/0063277 | A1 | 3/2009 | Bernosky et al. |
| 2009/0074235 | A1 | 3/2009 | Lahr et al. |
| 2009/0154806 | A1 | 6/2009 | Chang et al. |
| 2009/0213270 | A1 | 8/2009 | Ismert et al. |
| 2009/0324199 | A1 | 12/2009 | Haitsma et al. |
| 2010/0077424 | A1 | 3/2010 | Ramaswamy et al. |
| 2010/0122279 | A1 | 5/2010 | Zhang |
| 2010/0158488 | A1 | 6/2010 | Roberts et al. |
| 2010/0169911 | A1 | 7/2010 | Zhang |
| 2010/0306791 | A1 | 12/2010 | Deng |

FOREIGN PATENT DOCUMENTS

| | | |
|---|---|---|
| CN | 1262003 A | 8/2000 |
| CN | 1341240 A | 3/2002 |
| CN | 1574953 A | 2/2005 |
| CN | 1628302 A | 6/2005 |
| CN | 1679051 A | 10/2005 |
| CN | 1679261 A | 10/2005 |
| CN | 1719909 A | 1/2006 |
| CN | 1723458 A | 1/2006 |
| CN | 1739121 A | 2/2006 |
| CN | 2914526 Y | 6/2007 |
| CN | 101002472 A | 7/2007 |
| CN | 101021852 A | 8/2007 |
| CN | 101047833 A | 10/2007 |
| CN | 101120594 A | 2/2008 |
| EP | 0838960 A2 | 4/1998 |
| EP | 1482734 A2 | 12/2004 |
| EP | 1760693 A1 | 3/2007 |
| GB | 2419489 A | 4/2006 |
| JP | 9274467 A | 10/1997 |
| KR | 20020001088 A | 1/2002 |
| WO | WO 0209447 A1 | 1/2002 |
| WO | WO 02065782 A1 | 8/2002 |
| WO | WO 2006/059053 A1 | 6/2006 |
| WO | WO 2007/080133 | 7/2007 |
| WO | WO 2007148264 A1 | 12/2007 |

OTHER PUBLICATIONS

Non-final Office Action dated Oct. 26, 2010, for U.S. Appl. No. 12/085,754.
Final Office Action dated Apr. 12, 2011, for U.S. Appl. No. 12/085,754.
Non-final Office Action dated Nov. 29, 2010, for U.S. Appl. No. 12/085,830.
Final Office Action dated Aug. 19, 2011, for U.S. Appl. No. 12/085,830.
Non-final Office Action dated Nov. 29, 2010, for U.S. Appl. No. 12/085,927.
Final Office Action dated May 26, 2011, for U.S. Appl. No. 12/085,927.
Non-final Office Action dated Oct. 13, 2010, for U.S. Appl. No. 12/085,765.
Final Office Action dated Mar. 31, 2011, for U.S. Appl. No. 12/085,765.
Non-final Office Action dated Oct. 29, 2010, for U.S. Appl. No. 12/085,835.
Final Office Action dated Apr. 13, 2011, for U.S. Appl. No. 12/085,835.
Non-final Office Action dated Dec. 1, 2010, for U.S. Appl. No. 12/085,827.
Final Office Action dated Apr. 19, 2012, for U.S. Appl. No. 12/085,827.
Non-final Office Action dated Oct. 13, 2010, for U.S. Appl. No. 12/085,764.
Final Office Action dated Mar. 24, 2011, for U.S. Appl. No. 12/085,764.
Cheung et al., "Efficient Video Similarity Measure With Video Signature", Jan. 2003.
Oostveen et al., "Feature Extraction and a Database Strategy for Video Fingerprinting", 2002.
Non-final Office Action dated Nov. 10, 2010, for U.S. Appl. No. 12/085,834.
Final Office Action dated Mar. 25, 2011, for U.S. Appl. No. 12/085,834.
Non-final Office Action dated Dec. 14, 2010, for U.S. Appl. No. 12/085,823.
Notice of Allowance and Fees Due dated Aug. 19, 2011, for U.S. Appl. No. 12/085,823.
Non-final Office Action dated Jul. 26, 2012, for U.S. Appl. No. 12/085,752.
International Preliminary Report on Patentability and Written Opinion dated Dec. 25, 2008, for PCT Application No. PCT/CN2008/071039.
International Search Report dated Dec. 25, 2008, for PCT/CN2008/071039.
International Preliminary Report on Patentability and Written Opinion dated Feb. 26, 2009, for PCT Application No. PCT/CN2008/071083.
International Search Report dated Feb. 26, 2009, for PCT Application No. PCT/CN2008/071083.
International Preliminary Report on Patentability and Written Opinion dated Mar. 12, 2009, for PCT Application No. PCT/CN2008/071082.
International Search Report dated Mar. 12, 2009, for PCT Application No. PCT/CN2008/071082.
International Preliminary Report on Patentability and Written Opinion dated Sep. 4, 2008, for PCT Application No. PCT/CN2008/071046.
International Search Report dated Sep. 4, 2008, for PCT Application No. PCT/CN2008/071046.
International Preliminary Report on Patentability and Written Opinion dated Sep. 4, 2008, for PCT Application No. PCT/CN2008/071047.
International Search Report dated Sep. 4, 2008, for PCT Application No. PCT/CN2008/071047.
International Preliminary Report on Patentability and Written Opinion dated Mar. 5, 2009, for PCT Application No. PCT/CN2008/071023.
International Search Report dated Mar. 5, 2009, for PCT Application No. PCT/CN2008/071023.
International Preliminary Report on Patentability and Written Opinion dated Mar. 5, 2009, for PCT Application No. PCT/CN2008/071028.
International Search Report dated Mar. 5, 2009, for PCT Application No. PCT/CN2008/071028.
International Preliminary Report on Patentability and Written Opinion dated Feb. 19, 2009, for PCT Application No. PCT/CN2008/071029.
International Search Report dated Feb. 19, 2009, for PCT Application No. PCT/CN2008/071029.
International Preliminary Report on Patentability and Written Opinion dated Feb. 12, 2009, for PCT Application No. PCT/CN2008/071030.
International Search Report dated Feb. 12, 2009, for PCT Application No. PCT/CN2008/071030.
International Preliminary Report on Patentability and Written Opinion dated Feb. 26, 2009, for PCT Application No. PCT/CN2008/071038.
International Search Report dated Feb. 26, 2009, for PCT Application No. PCT/CN2008/071038.
International Preliminary Report on Patentability and Written Opinion dated Feb. 26, 2009, for PCT Application No. PCT/CN2008/071033.
International Search Report dated Feb. 26, 2009, for PCT Application No. PCT/CN2008/071033.

International Preliminary Report on Patentability and Written Opinion dated Oct. 16, 2008, for PCT Application No. PCT/CN2008/071041.
International Search Report dated Oct. 16, 2008, for PCT Application No. PCT/CN2008/071041.
English Abstract of JP 9274467 A dated Oct. 21, 1997.
English Abstract of CN 101002472 A dated Jul. 18, 2007.
English Abstract of CN 1739121 A dated Feb. 22, 2006.
English Abstract of CN 101120594 A dated Feb. 6, 2008.
English Abstract of CN 1719909 A dated Jan. 11, 2006.
English Abstract of WO 0209447 A1 dated Jan. 31, 2002.
English Abstract of CN 101047833 A dated Oct. 3, 2007.
English Abstract CN 2914526 Y dated Jun. 20, 2007.
English Abstract CN 1262003 A dated Aug. 2, 2000.
English Abstract CN 2387588 Y dated Jul. 12, 2000.
English Abstract CN 1679261 A dated Oct. 5, 2005.
English Abstract CN 1574953 A dated Feb. 2, 2005.
English Abstract CN 1628302 A dated Jun. 15, 2005.
English Abstract CN 1190218 A dated Aug. 12, 1998.
English Abstract CN 1341240 A dated Mar. 20, 2002.
English Abstract CN 1723458 A dated Jan. 18, 2006.
English Abstract CN 101021852 A dated Aug. 22, 2007.
English Abstract CN 1679051 A dated Oct. 5, 2005.
English Abstract KR 20020001088 A dated Jan. 9, 2002.

* cited by examiner

METHOD FOR FACILITATING THE SEARCH OF VIDEO CONTENT

RELATED APPLICATIONS

This application is the U.S. National Phase under 35 U.S.C. §371 of International Application No. PCT/CN2008/071028, filed on May 21, 2008, the disclosure of which Application is incorporated by reference herein.

FIELD OF THE PRESENT INVENTION

The present invention relates to a method for facilitating the search of video content.

The so called term "video clip" appearing in this specification means a finite duration video content along with associated audio tracks, whether in digital or analog formats. Since video content consists of time-consecutive frames of video images. A video clip consists of a finite number of time-consecutive number of video images, along with the associated audio tracks of the same duration.

The so called term "fingerprint" appearing in this specification means a series of dot information, in which each dot information is selected from a frame of pattern of television signals, and a plurality of frames can be selected from the television signals, and one or more dot data can be selected from one frame of pattern of television signals, so that the so called "fingerprint" can be used to uniquely identify said television signals.

The so called term "visually identical" appearing in this specification means that two video content segment are visually identical if they are obtained from a single video image capture or recording device at the same time. In other words, they originate from a single video source and at the same time, i.e., a single time-space video source. For example, two copies of a single video tape are visually identical because they are from the same source. Two versions of compressed video data streams are visually identical if they are encoded and/or re-encoded from the same video content source, despite the fact that they may have different compression formats, bit rates or resolutions. On the other hand, two different video recordings of the same scene, but shot from two different cameras, or two different video recordings of the same scene but shot at different times from the same camera, are NOT visually identical because they are not created from a single time-space video source. When there are two different video recordings of different durations, a section of each recording may still be visually identical.

The fingerprint is used to seek out visually identical video segments between two different video content pieces. The content pieces may be in analog recording format, or in digital compressed format, or in digital uncompressed format. When two video clips are to be compared to determine if they are visually identical, in stead of comparing the two video contents, an automatic procedure can be deployed to compare the fingerprints obtained from each of the video clips. If the fingerprints match each other, then it is to say that the video clips are visually identical to each other.

A typical application is to use the technique to perform fingerprint based identification of video content. Specifically, known video clips are first registered into a fingerprint database, and when new video clips are obtained, their fingerprints are compared with the fingerprints already in the database to determine if the new content is visually identical to a previously registered video clip.

In this document, the terms "video", "video content", and "video signals" generically represent the same concept, i.e., visual information that can be displayed on television or computer monitors. The terms "video frames", "digital video images", and "video image frames" generically represent digitized video images, i.e., time-consecutive images that together form the motion video content. The video images, as part of the same video content, have the same number of video samples formed in rows and columns. The number of samples in a row is the width or horizontal resolution of the image, and the number of samples in a column is the height or the vertical resolution of the image.

In addition, the term "fingerprint" or "fingerprint data" represent the data formed by sampling consecutive video frames. The fingerprint or fingerprint data can be used to determine if two video contents are visually identical or not. Continuous samples of video frames form fingerprint data streams, or fingerprint streams. To better organize the fingerprint stream, sometimes, it is necessary to partition a continuous fingerprint stream into multiple segments. These segments are so called "fingerprint data segments" or just "fingerprint segments".

BACKGROUND OF THE PRESENT INVENTION

With digital compression technology, it is possible to carry many television channels in the spectrum space of a single analog channel. Because of this, more television channels are transmitted over the same spectrum, and there are more channels for viewers to watch. Digitally compressed video and audio signals are binary data streams that can be transmitted, stored and played out as computer data files or streams. Therefore, digital video/audio data are typically handled in digital forms during production, transmission and storage phases.

Most of the video content in television broadcast, cable broadcast and on the internet originates in digital formats. Most of the content is already produced and stored in digital storage devices before it is distributed to consumers. For the purpose of managing advertising activities and marketing campaigns, government regulation enforcement, market research, and broadcasting signal monitoring, there is a need to continuously monitor the video signals as they are distributed to viewers.

In prior art, the operator may be given a video clip and be asked to search through the archived recordings to see where and when the video clip has shown up in video distributions in the past. In other words, the operator may be asked to search through the archived recordings to seek video content that is visually identical to the given video clip. For example, advertisers may want to determine if a particular commercial video has been distributed properly over the last year in certain geographic areas, so that they can track the effectiveness of their advertising campaign.

There are several problems with the above. The first problem is the fact that video content typically consumes massive amount of storage capacity. For example, a single channel of television content broadcast for 24 hours would consume at least 10 GB. For the purpose of monitoring thousands of television channels for a year or more, the storage capacity requirement can easily get into the Petabyte (1 PB=1,000,000,000,000,000 bytes) ranges.

The other problem is that even if the content is saved in storage systems, the cost to maintain, search and archive the content data can be too expensive for most users. This cost is reflected in terms of storage, computation and network hardware systems needed to perform the tasks. In many scenarios, the information to be archived and searched is not on the specific content itself, but more specifically related to when and where the content is distributed. This information can be valuable for content owners, marketers and relevant government regulators to track the coverage of specific video content. The purpose of this invention is to provide a method to facilitate this capability.

Therefore, there is a need to provide a method for facilitating the archiving and search of video content without a huge storage capacity required, and to be able to search the information easily at low hardware cost. There is also a need to collect statistics and extraction additional information from the archived video information automatically.

SUMMARY OF THE INVENTION

It is object of the present invention to provide a method for facilitating the search of video content, which can collect statistics and extraction additional information from the archived video information automatically.

It is another object of the present invention to provide a method for facilitating the search of video content, which can extract fingerprint information from video content for the purpose of archiving without the huge storage capacity required.

It is another object of the present invention to provide a method for facilitating the search of video content, which can search through video fingerprint data for identifying information and statistics about historical recording of video content easily at low hardware cost.

It is another object of the present invention to provide a method for facilitating the search of video content, which can extract fingerprint information from video content across geographically different remote locations and over long period of time for the purpose of archiving without the huge storage capacity required.

Therefore, according to the present invention, there is provided a method for facilitating the search of video content, comprising the steps of submitting a video content clip for specific time duration of video content; extracting a fingerprint associated with the video clip by a fingerprint extractor; selecting database entries matching the specific time of video content from a fingerprint archive database; delivering the database entries matching the specific time of video content to a search module; reconstructing the searched database entries into continuous fingerprint streams by the search module, in which the searched database entries from the same location and channel are grouped together, and the fingerprint data sections are stripped out of the entries and concatenated according to the segment ID and time-stamps contained within each entry; searching for a match with the fingerprint associated with the video clip by a matcher from the continuous fingerprint streams to find a match; and combining a matching result with additional information obtained from the archive entries to form a search report.

Preferably, the additional information obtained from the archive entries is time, location, channel, and/or content types.

Preferably, the video content clip is from an analog video tape player, an analog video output of a digital set-top or personal video recorder (PVR) receiver, an analog output of a DVD player, or an analog video output of a video tuner receiver module.

Preferably, a converter is used to take the video clip as input, to perform analog to digital conversion and to pass the resulting digitized video frame data to the fingerprint extractor, which obtains the fingerprint samples for the video frames transferred from the converter.

Preferably, the video content clip is in digital compressed video data format, and it is made to first go through the receiver converter to perform decompression and deliver the digital decompressed video signals to the fingerprint extractor.

Preferably, the input to the extractor is the digitized video frame data, and it is stored into a frame buffer, and a sub-sampler obtains selected samples from each video frame data.

Preferably, said fingerprint entries are searched from said archive database according to location, time, channel, and/or programming content.

Preferably, said fingerprint stream is advanced relative to said searching fingerprint by one frame and the matching operation is repeated, if a match is not found.

Preferably, if a match is found, the additional information associated with the entries is combined with the information on the searching video clip to product a single report message.

Preferably, multiple searching operations, each corresponding a different searching video clip, can be performed concurrently with each other.

By using fingerprint in stead of the video content itself, it is possible to archive huge amount of video content without the associated storage capacity required. For example, it is possible to maintain a fingerprint archive for 1000 television channels, on a 24 hours basis, for 10 years, with a fingerprint archive database of no more than 40 terabytes (1 TB=1,000,000,000,000 bytes). However, to store video of the same duration at 1 million bits per second, the storage required would be 40 petabytes (1 PB=1000 TB), which is 1000 times higher than maintaining a fingerprint archive.

In addition, the fingerprint archive can be automatically compared for searching applications. For example, a user may have a video clip of 15 seconds, and wants to know if this same video clip has ever appeared in the past 10 years in any of the 1000 television channels. By using the technique from this invention, it would be possible to obtain information on: time of its appearance; location of the distribution (where the video content was originally recorded); and channel number, i.e., which television channel actually carried this signal, so that it is possible to know whether the video has appeared anywhere in the recorded archive.

By using the invention described in this document, it's possible to perform a search like the above across a huge archive which would be impossible if the video content itself, instead of the fingerprint data, is used.

DETAILED DESCRIPTION OF THE PRESENT INVENTION

In the present invention, discussions are focused on the handling and processing of digital video data streams. The method can be extended to audio data streams by using variations of the techniques and will not be discussed here.

Video monitoring requires that video content distribution activity be identified by time, location, channel assignment or network origination address. In addition, the monitoring must be identified by its source content. The preferred way to monitor video content is to have a recording of the video content as it's distributed. Such recording typically is in digital formats, stored as data files in a computer system. The recording also has the additional information attached to the recording itself, such as time, location, etc. At a later time, when an operator decides to verify the video content distribution, he or she can simply retrieve that video recording and view it in person.

In this invention, we provide a method for facilitating the archiving and search of video content.

Figure 1:
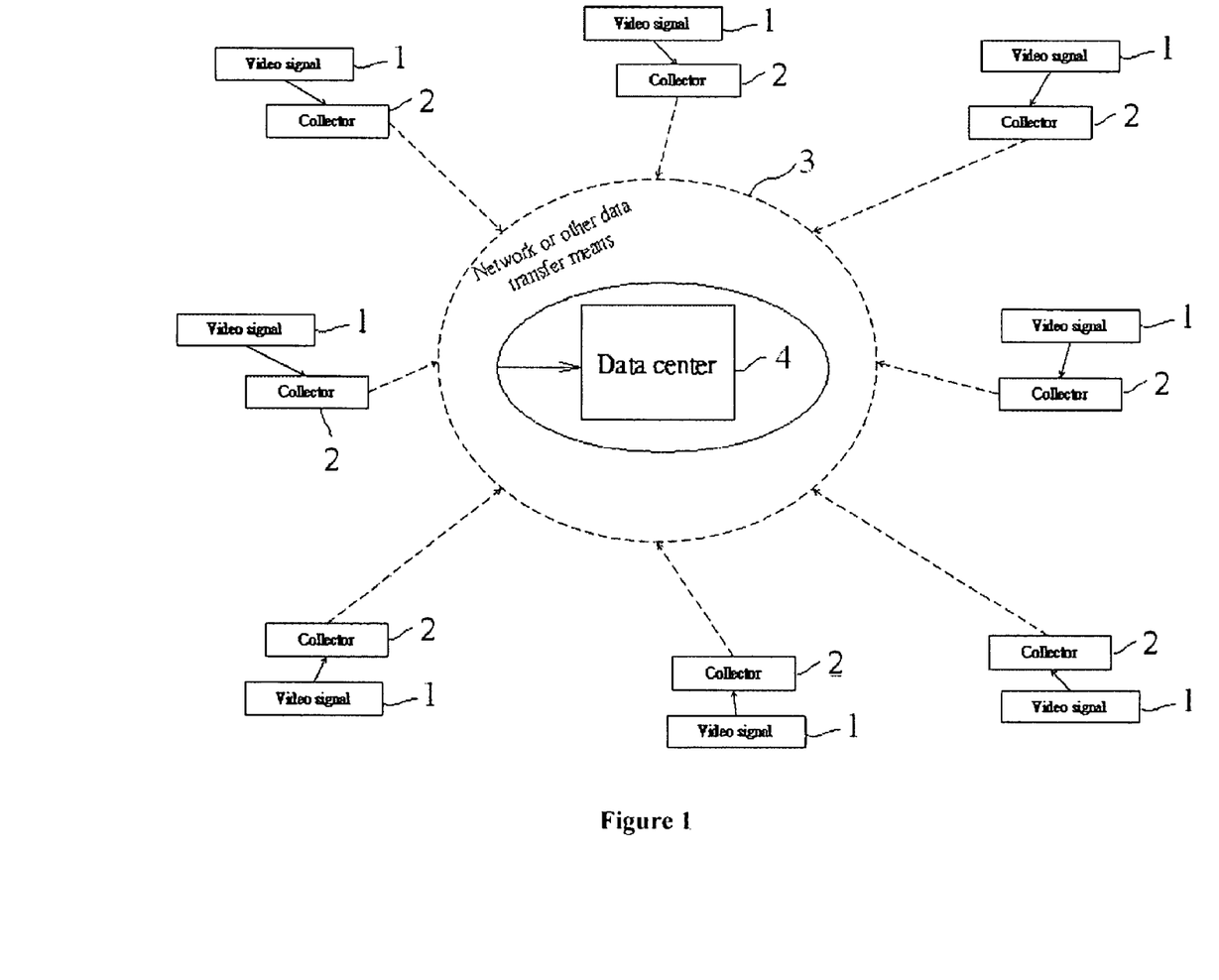
FIG. 1 is a schematic view for collecting video statistics, in terms of its fingerprints, and submitting it to a data center over a network or other data transfer means.

As shown in FIG. 1, video signals 1 are distributed in many geographically different places. Moreover, the video signals 1 may be distributed over different time periods. A collector 2 is deployed where the video signal 1 is distributed to record the signal. Many such collectors 2 send the collected data to the data center 4 for further process. The data path between the collectors 2 and the data center 4 can be the network 3 based on the IP protocols, wireless networks, telephone modem and telephone networks, or removable storage devices hand carried physically. The video signals 1 that the collectors 2 receive may be either in analog or digital format.

Figure 2:
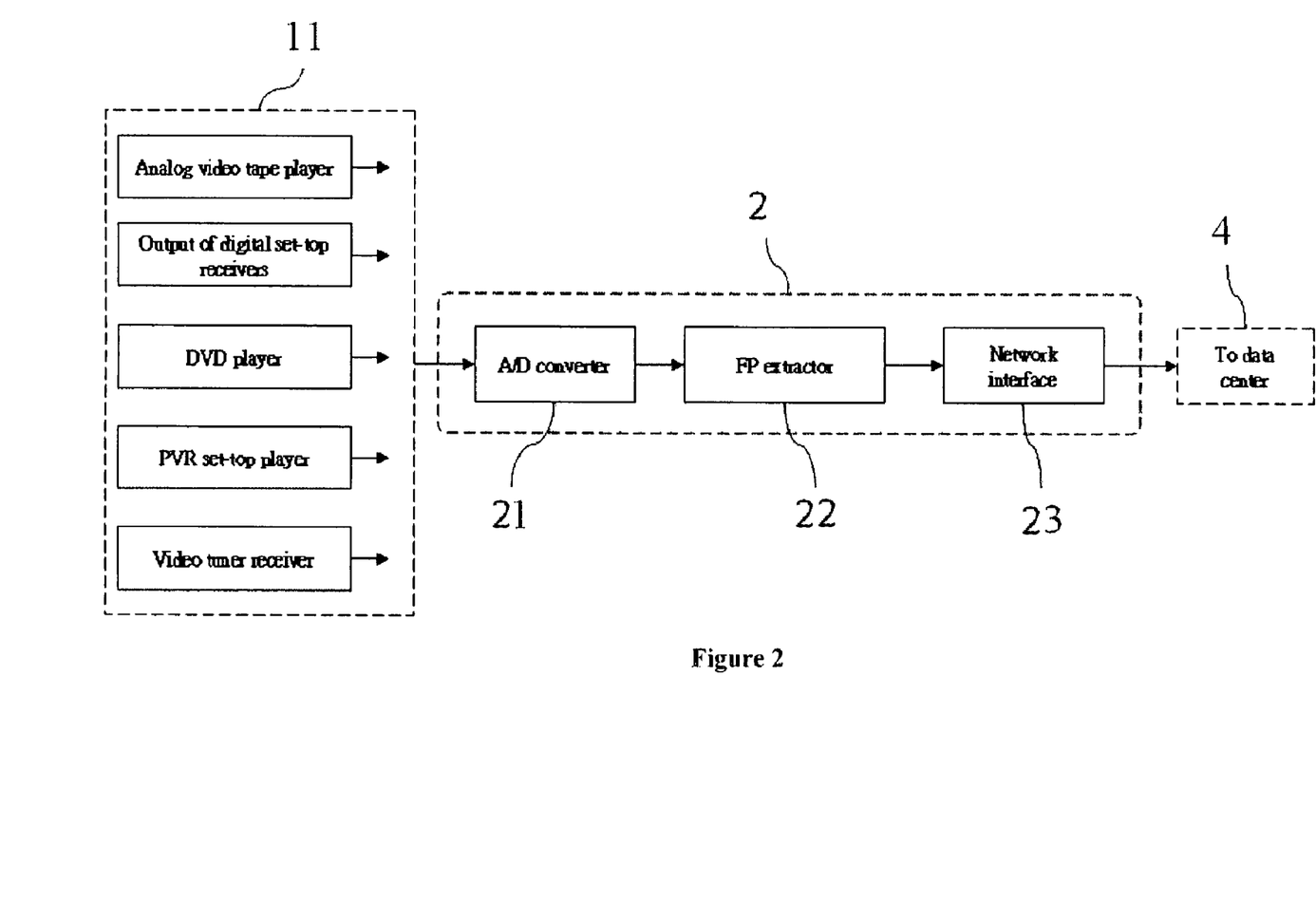
FIG. 2 is a schematic view for collecting video fingerprint data from analog video signal sources.

FIG. 2 shows the key components for the collector 2 which takes analog video signal 11 as input. Typical analog format video signal source may be from an analog video tape player, the analog video output of a digital set-top or personal video recorder (PVR) receiver, the analog output of a DVD player, or the analog video output of a video tuner receiver module. Within the collector 2, the analog to digital (A/D) converter 21 is used to first digitize the analog video signal 1 into digital video sample images before they are sent to the fingerprint extractor 22. The network interface 23 is used to transfer the extracted video fingerprint data to the data center 4.

Figure 3:
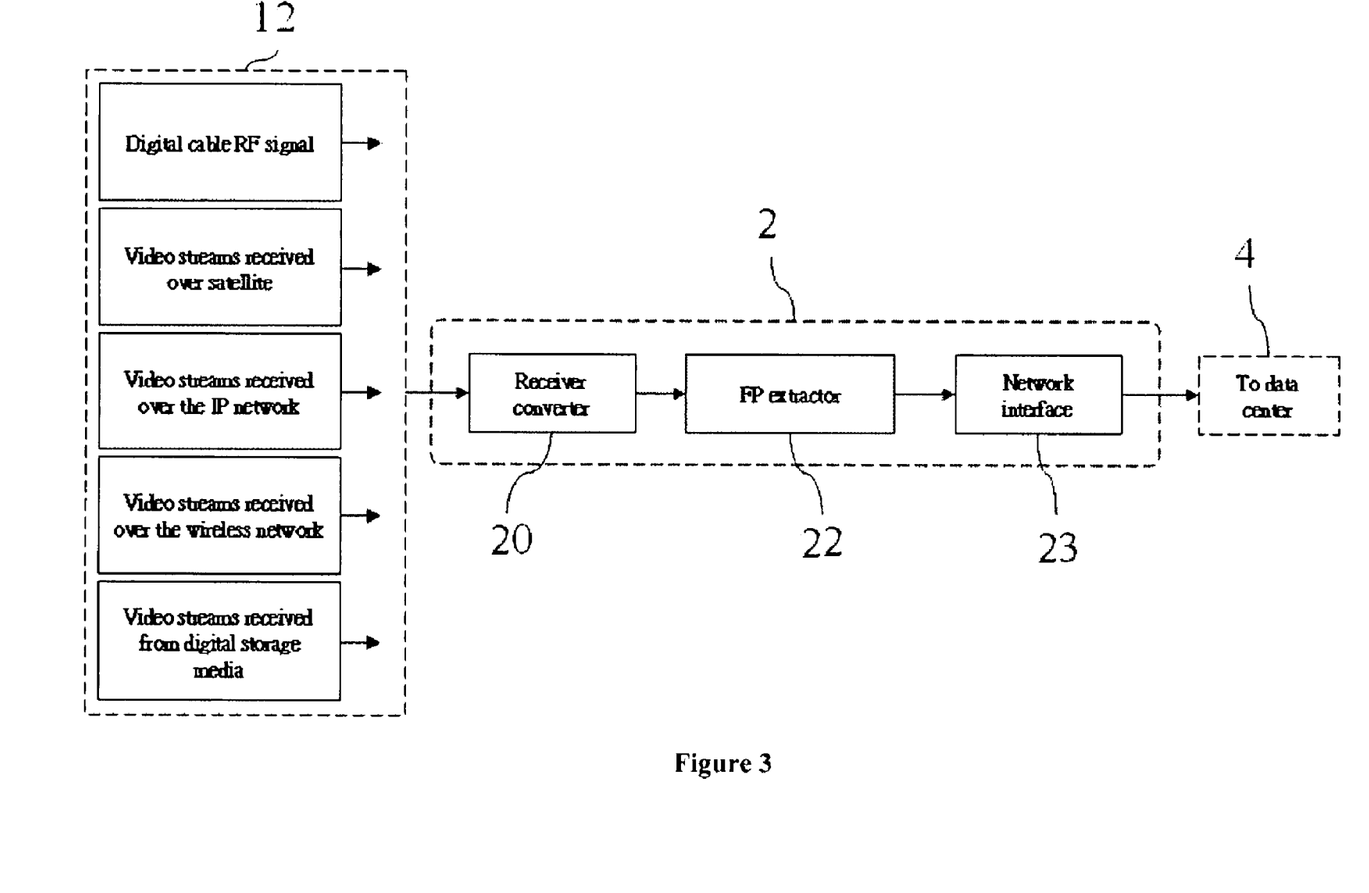
FIG. 3 is a schematic view for collecting video fingerprint data from digital video signal sources.

FIG. 3 shows the key components for a collector 2 receiving digital format video signal 12. In this case, the video data is preferably in digital compressed video data format. The compressed data stream must first go through the receiver converter 20. The receiver converter 20 performs the decompression of the video data stream and deliver the digitized video image data to the fingerprint extractor 22, and rest of the steps is similar to that of FIG. 2.

Figure 4:
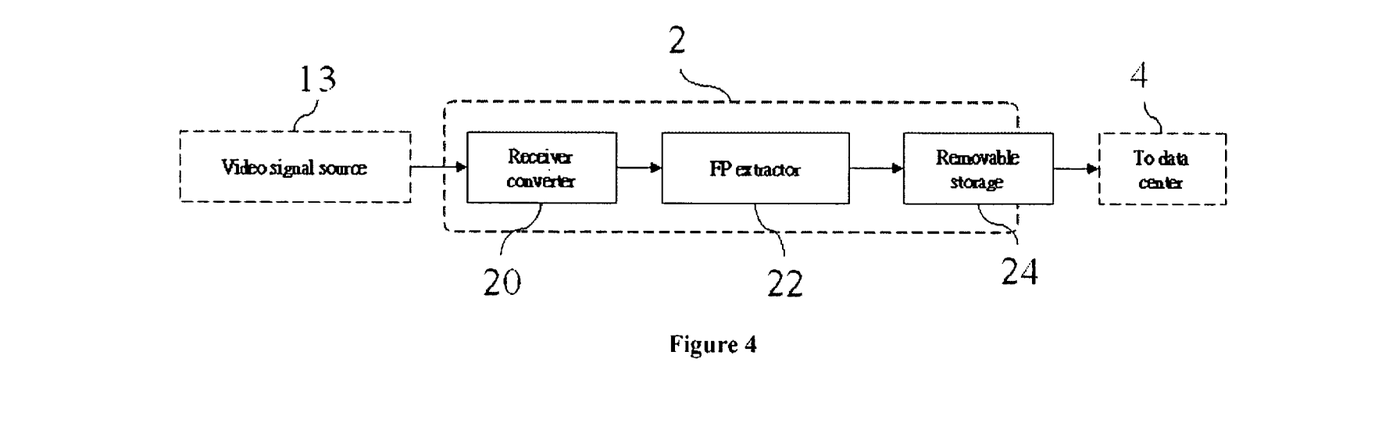
FIG. 4 is a schematic view for collecting video fingerprint data and storing the data in removable storage devices which can be physically delivered to the data center.

FIG. 4 shows the situation when no network transfer is available. In this case the extracted video fingerprint data is stored in the local removable storage device 24, which can later be hand delivered physically to the data center 4.

Figure 5:
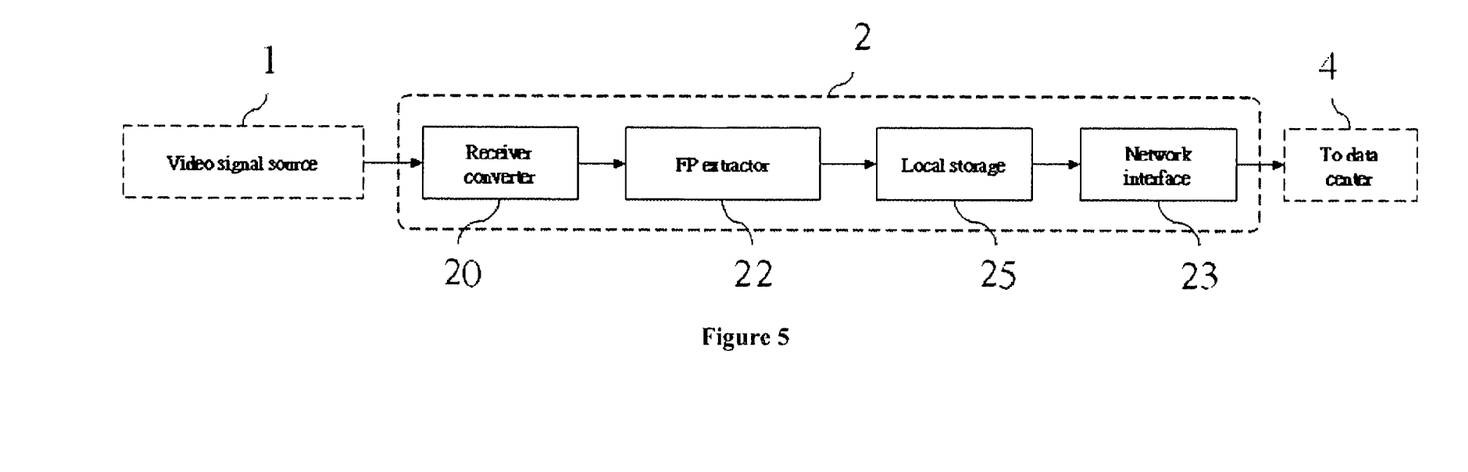
FIG. 5 is a schematic view for collecting video fingerprint data and storing the data in local storage devices for later transfer over a network to the data center.

Alternatively, the extracted fingerprint data can be stored in a local storage 25 that is not removable but can be transferred via the network interface 23 and the network connection to the data center 4 at non-regular time intervals or at pre-scheduled time. This is shown in FIG. 5.

Figure 6:
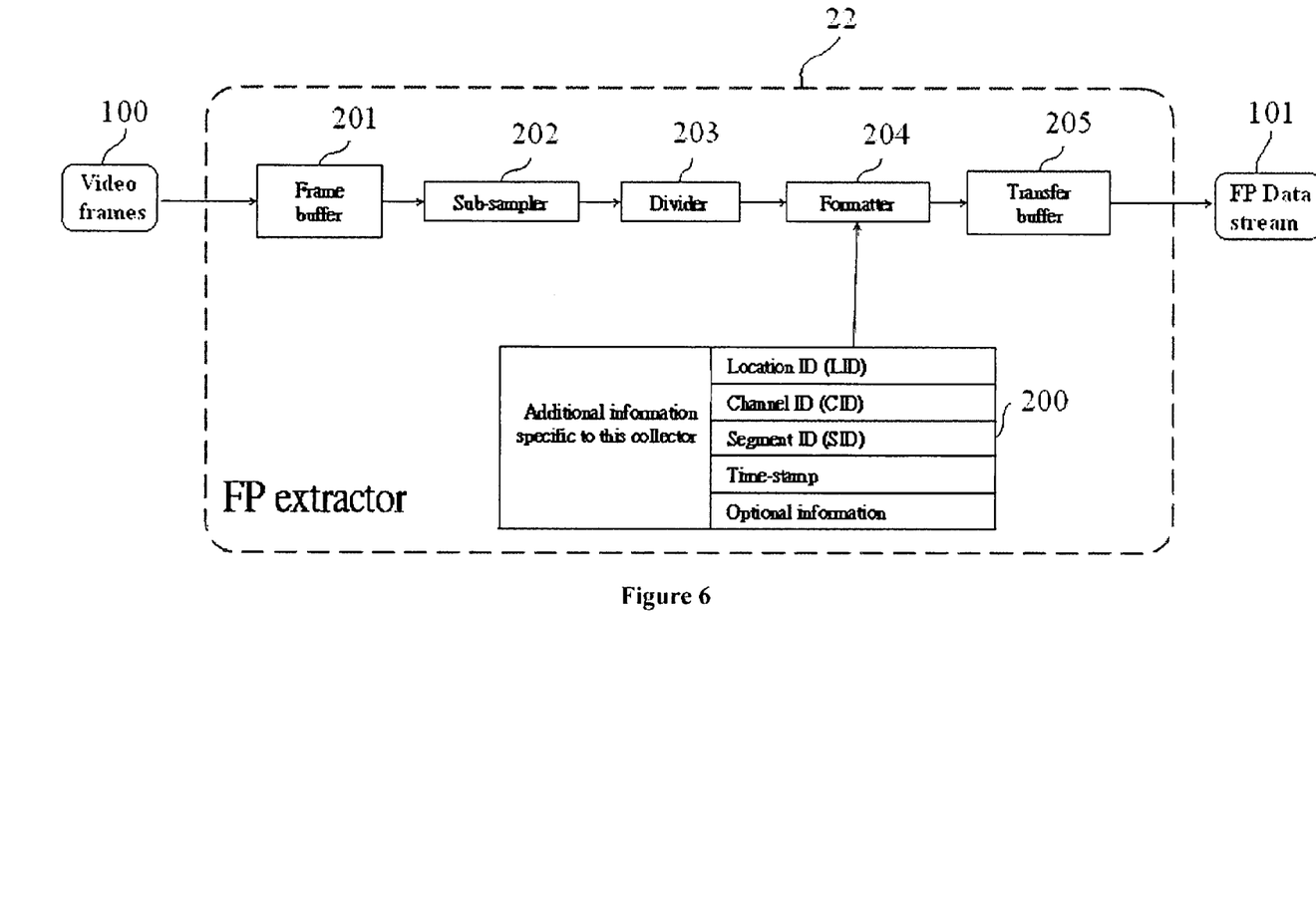
FIG. 6 is a schematic view for performing the fingerprint extraction with local capture information embedded into the extracted fingerprint data streams.

FIG. 6 shows how the fingerprint data is extracted. The purpose of the collector is to provide tracking information of the video content delivery so that the information can be searched at a later time. During the video fingerprint extraction process, additional local information 200 must also be incorporated into the extracted video fingerprint data. The incoming video frame data 100 is first stored into the frame buffer 201, which will be sub-sampled by the sub-sampler 202. The divider 203 is used to break the sub-sampled fingerprint data stream down into data segments along the video image frame boundaries. This will be discussed in further detail in later sections. The output of the divider 203 contains sub-sampled image values, so-called the video fingerprint data. The data is then combined by the formatter 204 with local collector information 200. This information 200 includes location, channel number, time-stamp (which is used to mark the time at which the fingerprint data is taken), and segment ID (which is time ordering information to relate the video frames 100). The output of the formatter 204 has all of the above information 200 organized as data packets which will then be sent out via the transfer buffer 205.

Figure 7:
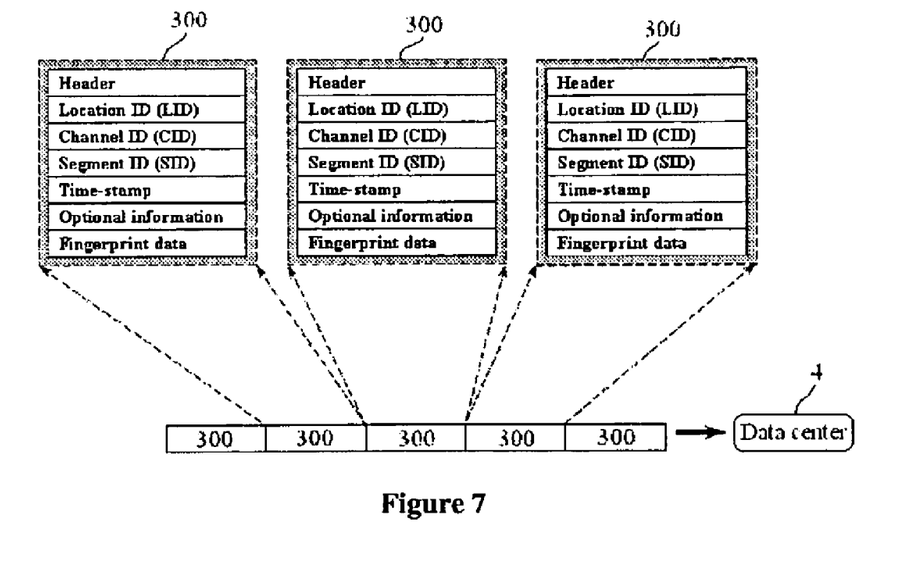
FIG. 7 is a schematic view for organizing multiple segments of fingerprint data for transfer to data center as continuous data streams.

The data organization within the transfer buffer 205 is as shown in FIG. 7, in which extracted fingerprint data, along with local capture information, are sent to data center 4 as data packets 300. The information fields within the data packets 300 do not have to in the same order as shown in FIG. 7. Other orders can also be used. In the transfer buffer 205, many fingerprint data packets 300 are stored temporarily before they are sent out. The order of the data packets 300 at which they enter and depart from the buffer 205 is assumed to be first come first out (FIFO). In the FIG. 7, three data packets 300 are shown, each of them contains the fingerprint samples for a group of time-consecutive video images. The next packet contains fingerprint data samples for a next group of video images which follow the previous group in time in the original video content. Each of the data packets 300 is self contained with its own data header, location, channel, segment number, time-stamp and other auxiliary information. The fingerprint data is also part of the packet 300. The data header may contain information to assist the extracting and parsing of data from the packet 300 later on. For example, it may provide unique binary patterns as head flags, and packet length information. Optional information may further describe, but not limited to, the number of video frames 100 associated with the samples in this packet 300, and the manner at which the samples are made.

Figure 8:
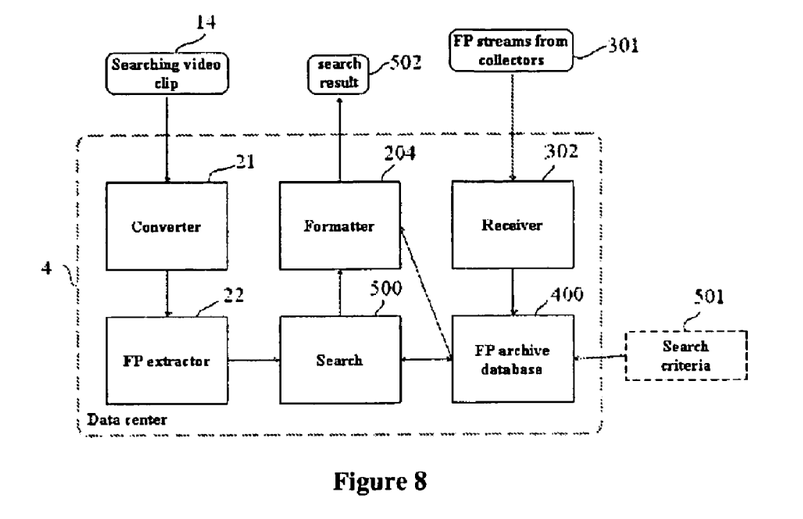
FIG. 8 is a schematic view for retrieving fingerprint entries in the fingerprint archive database with certain search criteria.

The data packets 300 are transferred to the data center 4 and become part of the fingerprint archive database. The database will be organized by the data packets 300 received, as shown in FIG. 8. In other words, each packet 300 appears as an entry in the database that can be searched according to some rules later on. The attributes that can be used in the search include the information fields in the data packets 300.

The fingerprint archive database can hold such packets 300 from potentially large number of collectors 2 over a long period of time durations, and across many television channels or video source. For example, it may contain data for all of the television channels distributed in an entire country over the last ten years.

The database can be searched according to some specific rules. For example, it is possible to search the archive and extract the entries for a specific location or for specific time duration.

Before further describing how to make use of the fingerprint archive database, we first discuss the basic processing components with the data center 4. This is shown in FIG. 8.

The data center 4 typically operates as follows. A user submits a video content clip 14, which is for specific time duration of video content. The video clip 14 preferably is in digital compressed video data format. The converter 21 takes the video clip 14 as input and performs decompression and passes the resulting digitized video frame data to the fingerprint extractor 22, which obtains the fingerprint samples for the video frames transferred from the converter 21. The output of the fingerprint extractor 22 contains the fingerprint samples associated with the video clip 14.

Figure 9:
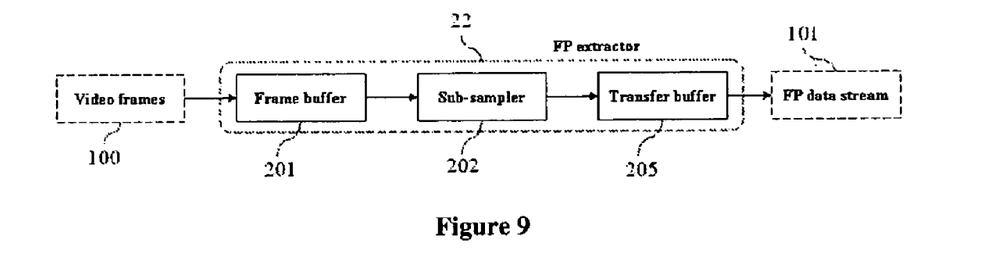
FIG. 9 is a schematic view for the processing modules within the data center.

The fingerprint extractor 22 preferably operates as shown in FIG. 9, where the input to the extractor is the digitized video frame data 100 and it will be stored into the frame buffer 201. The sub-sampler 202 obtains selected samples from each video frames 100. This sampling process is shown in FIG. 10.

Illustration below will focus on the internal operations of the fingerprint extractor 22 in some greater detail, see FIG. 10.

Figure 10:
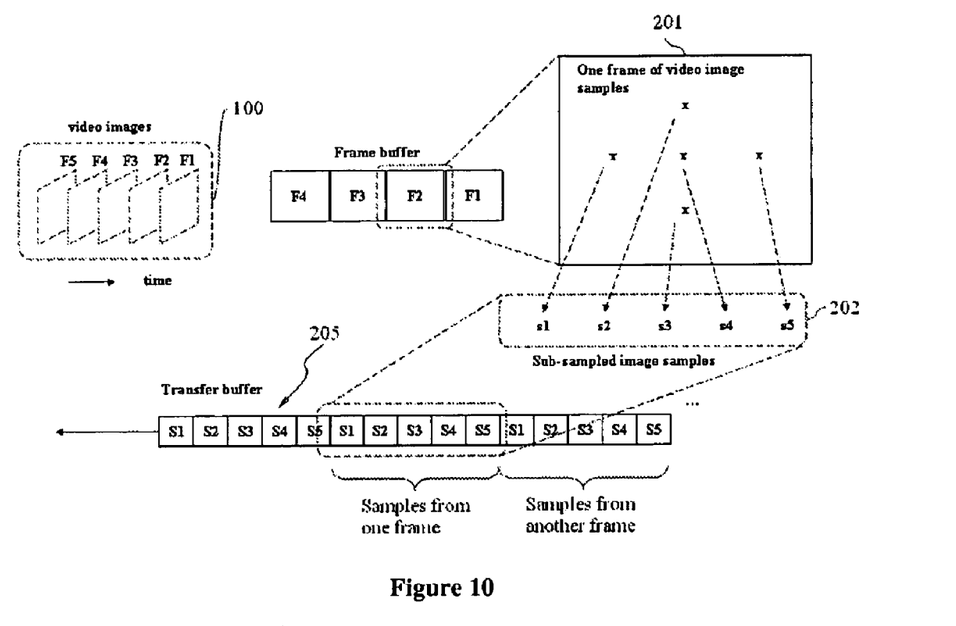
FIG. 10 is a schematic view for the processing modules with the fingerprint extractor.

In FIG. 10, video images 100 are presented as digitized image samples, organized on a per frame basis. In a preferred embodiment, five samples are taken from each video frame 100. The frames F1, F2, F3, F4 and F5 are time continuous sequence of video images 100. The intervals between the frames are ½5 second or ⅓0 second, depending on the frame rate as specified by the different video standard (such as NTSC or PAL). The frame buffer 201 holds the frame data as organized by the frame boundaries. The sampling operation 202 is performed on one frame at a time. In the example shown in FIG. 10, five image samples are taken out of a single frame, they are represented as s1 through s5, as in 202. These five samples are taken from different locations of the video image 100. One preferred embodiment for the five samples is to take one sample s4 at the center of the image, one sample s1 at the half way height and half way left of center of image, another sample s5 at the half way height and half way right of center of image, another sample s2 at half width and half way on top of center of image, and another sample s3 at half width and half way below of center of image.

In the preferred embodiment, each video frames 100 are sampled exactly the same way. In other words, image samples from the same positions are sampled for different images, and the same number of samples is taken from different images. In addition, the images are sampled consecutively.

The samples are then organized as part of the continuous streams of image samples and be placed into the transfer buffer 205. The image samples from different frames are organized together into the transfer buffer 205 before it's sent out. Sampling on images may be performed non-consecutively. In other words, the number of samples taken from each image may be different.

Separately, as shown in FIG. 8, a set of search criteria 501 is provided to the fingerprint archive database 400. Database entries matching the search criteria 501 will be selected and delivered to the search module 500. For example, all those entries for a specific range of days on the calendar may be retrieved from the database and be delivered to the search module 500. The search module 500 then reconstructs the received entries into continuous fingerprint streams. The reconstruction process is the reverse of the steps in FIG. 6 and FIG. 7. This process is further elaborated in FIG. 12. The reconstruction process is applicable only on a per video stream basis. In other words, only fingerprint segments from the same location and channel can be reconstructed back into a continuous fingerprint stream. In other words, the searched database entries from the same location and channel are grouped together and the fingerprint data sections are stripped out of the entries and concatenated according to the segment ID and time-stamps contained within each entry. Once the fingerprint array is formed it is the compared with the output of the fingerprint extractor 22 in FIG. 8 (also shown as fingerprint 101 in FIG. 12).

Figure 11:
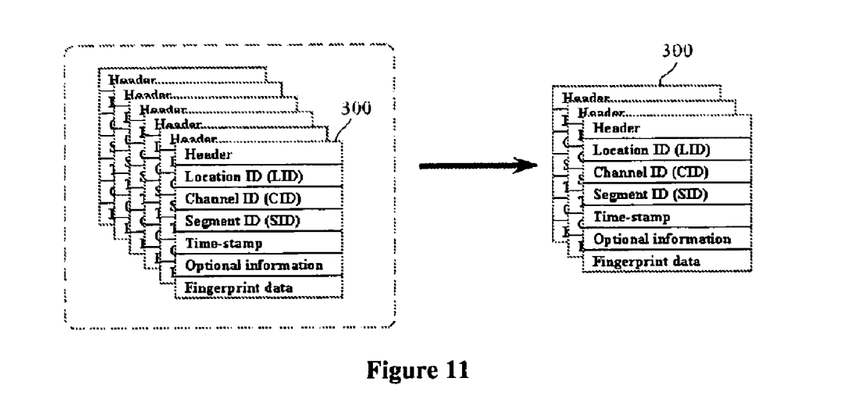
FIG. 11 is schematic view for the processing steps for performing the image sampling as part of the video fingerprint.

Next it is to show how the selected entries from the archive database 400 can be prepared for the matching operation with the video clip 14. This is illustrated in FIG. 11, where four example entries 300 are selected from the fingerprint archive data for matching to the fingerprint obtained from the converter 22. Each of the entries 300 contains the fingerprint data associated with a group of video images 100. The selected entries 300 preferably are associated with continuous video images 100 from the original video signal 11.

Fingerprint archive database 400 holds entries for fingerprint streams from many locations, channels and over potentially very long period of time durations. Fingerprint entries can be retrieved from the database according to location, channel, and time. Fingerprint entries selected meet a specific attributes. Further search among this data results in video information meeting the same attributes.

The fingerprint data segments are then copied out of the entries and assembled into a continuous fingerprint data stream. This stream is the restored output of the sub-sampler within fingerprint extractor 22 shown in FIG. 6 and FIG. 7.

Figure 12:
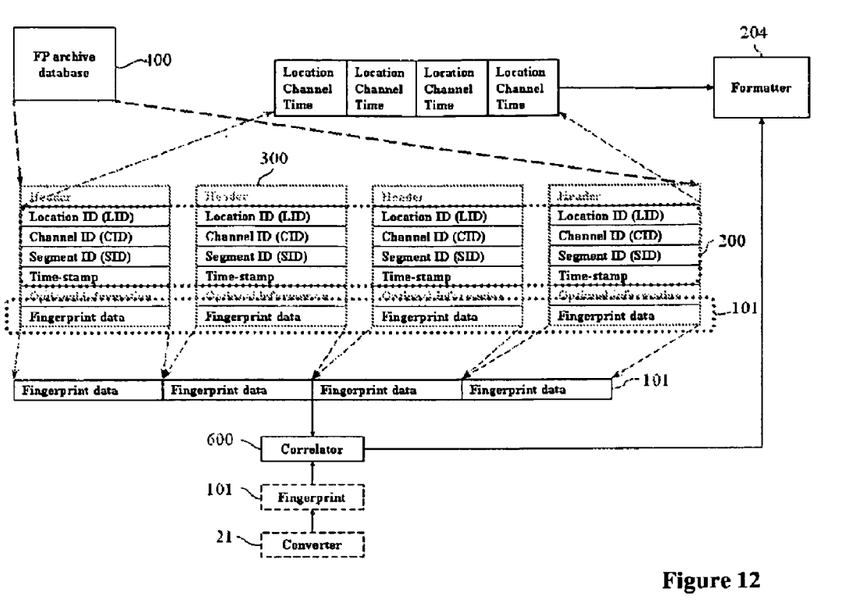
FIG. 12 is a schematic view for performing the fingerprint based search from a fingerprint archive database.

The matcher or correlator 600 in FIG. 12 takes the fingerprint segment obtained from the fingerprint extractor 22 and matches that to the assembled fingerprint data stream. The matcher 600 contains information on whether the two fingerprints are matched or not. If matched, the underlying video content are considered visually identical, the output message is generated and sent to the formatter 204. In addition, the corresponding collector capture information is extracted from the associated archive database entries, such as location, channel, time and other information. This information is then combined with the matcher output message by the formatter 204 and be sent out.

The matcher 600 takes in two fingerprint data sets. The first is the finite duration fingerprint obtained from the input video clip 14. The second is the fingerprint stream reconstructed from the searched fingerprint archive database 400. The matching result between the two, combined with the additional information obtained from the archive entries, such as time, location, channel and content types, are then put together as the search report. The output of the formatter 204 therefore contains information on when and where the original video clip 14 appeared in the video signals captured by the remote collectors 2.

Figure 13:
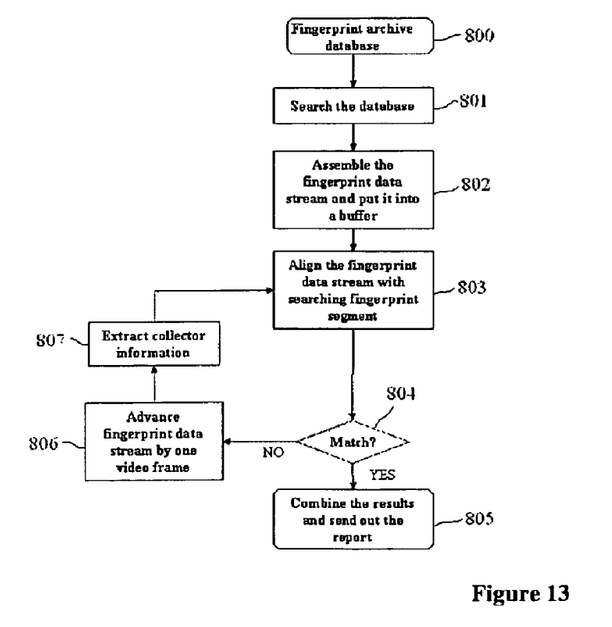
FIG. 13 is a schematic view for the decision process within the data center regarding matching and search of a video clip from within the fingerprint archive database.

More specifically, as shown in FIG. 13, the fingerprint archive database 800 contains all of the collected fingerprint archive data packets as its data entries. The database search operation (step 801) is initiated when operator wants to retrieve all of the database entries meeting certain search criteria, such as location, time and channel. The database then delivers the searched results, as a collection of entries formatted as shown in FIG. 7, FIG. 11 and FIG. 12. The searched entries are then organized according to specific location and channels, i.e., entries from the same location and same channel are from a single video source and thus will be reassembled together. The assemble process (step 802) is already explained in greater detail as 101 in FIG. 12.

Once the fingerprint reconstruction is complete, it is aligned and compared against the fingerprint data obtained from the searching video clip (steps 803, 804). If the result is a match, it means that the two fingerprints represent two visually identical pieces of video content. In this case, the additional information obtained form the data entries, such as location, channel, time and any optional information, will be combined with the information on the searching video clip to product a single report message (step 805). If the two fingerprints do not match, then the fingerprint array obtained from (step 802) is advanced by one frame relative to the searching fingerprint (step 806), and the corresponding information obtained from the newly included fingerprint data points will be updated as well (step 807). The process is then repeated at (step 803).

The invention claimed is:

1. A method for facilitating the search of video content, comprising the steps of:
    submitting a searching video clip of digitized video image frame data for a time duration;
    extracting a fingerprint from the searching video clip;
    selecting at least one database entry matching a specific time of searching video clip from a fingerprint archive database storing fingerprint data extracted from distributed video content;
    delivering the at least one database entry matching the specific time of searching video clip to a search module;
    reconstructing a data segment in the at least one database entry into continuous fingerprint streams by the search module, wherein entries in the at least one database entry from the same location and channel are grouped together, and fingerprint data sections are stripped from the entries and concatenated according to segment ID and time-stamps contained within each of the entries;
    searching for a match with the fingerprint from the continuous fingerprint streams to generate a matching result;
    wherein a stream in said fingerprint streams is advanced relative to said fingerprint corresponding to one video frame at a time and the fingerprint matching operation is repeated, if the match is not found;
    wherein if a match is found, additional information associated with the entries is combined with information on the searching video clip to generate a single report message; and
    combining the matching result with additional information obtained from the fingerprint archive database comprising time, location, and channel of distribution information to form a search report.

2. The method according to claim 1, wherein the additional information obtained from the fingerprint archive database comprises content types.

3. The method according to claim 1, wherein the digitized video image frames are delivered to a fingerprint extractor to obtain the fingerprint.

4. The method according to claim 3, wherein the searching video clip is encoded in digital compressed video data format and is made to first go through a converter to undergo decompression and the decompressed digital video frames are delivered to the fingerprint extractor.

5. The method according to claim 3, wherein the digitized video frame data is stored into a frame buffer, and a sub-sampler obtains selected samples from each video frame data to form the fingerprint.

6. The method according to claim 1, wherein said fingerprint entries are searched from said fingerprint archive database according to location, time, channel, and/or programming content.

7. The method according to claim 1, wherein the single report message contains channel, video recording time of the start and end frames of the matched fingerprint and geographic location of the video recording.

* * * * *